UNITED STATES PATENT OFFICE.

WILLIAM B. CHISOLM, OF CHARLESTON, SOUTH CAROLINA.

MANUFACTURE OF FERTILIZERS.

1,147,926. Specification of Letters Patent. Patented July 27, 1915.

No Drawing. Application filed August 16, 1909. Serial No. 513,040.

*To all whom it may concern:*

Be it known that I, WILLIAM B. CHISOLM, a citizen of the United States, residing at Charleston, in the county of Charleston and State of South Carolina, have invented certain new and useful Improvements in the Manufacture of Fertilizers; and I do hereby declare the following to be a full, clear, and exact description of the invention, such as will enable others skilled in the art to which it appertains to make and use the same.

In Letters Patent of the United States, granted to me under date of the 26th day of June, 1906, No. 824,281, I have described a fertilizer composed of an intimately associated mixture of finely ground particles of sulfur and phosphatic rock, and obtained by grinding the sulfur, preferably in the form of rock sulfur, with phosphatic rock in the same grinding operation, whereby the hard particles of the rock prevent the sulfur from flaking in the mill and permit it to be reduced with the phosphatic rock itself to a homogeneous mixture in the form of a substantially impalpable powder.

My present invention relates to means for expediting the action of the fertilizer in the soil by starting or initiating the formation of sulfuric acid from the sulfur contained in the mass and consequently starting or initiating the formation of available phosphoric acid therein, whereby the subsequent formation of additional quantities of available phosphoric acid is correspondingly expedited and increased, when the fertilizer is spread upon or in the soil.

In carrying out my invention, I subject the fertilizer, consisting of the extremely light, powdery, homogeneous ground mixture of sulfur and phosphatic rock to the action of moisture preferably in the shape of steam (which may conveniently be at a temperature of from 215° F. to 260° F.) or atomized water and thereupon I preferably pack it by means of a baling press or the like, in bags placed under considerable pressure. The steam may be conveniently applied by placing the material in a closed chamber, into which the steam is admitted from a convenient source of supply. The effect of this treatment is to impart moisture to the material, which moisture initiates the formation therein of sulfuric acid, so that, when the fertilizer is subsequently spread upon or in the soil, the formation of sulfuric acid need not await the action of the moisture contained in the air or soil to initiate it, but will already have commenced and will proceed with much greater celerity, inasmuch as the sulfuric acid already developed in the material renders it correspondingly hygroscopic or attractive to moisture. The initial and continuing conversion of the sulfur in the mass into sulfuric acid and of the phosphatic material into available phosphoric acid and soluble calcium phosphate proceeds in accordance with the following formulæ:—

First, $S + H_2O + 3O = H_2SO_4$

When the mixture is subjected to the action of steam, the partial conversion of the sulfur into sulfuric acid is apparently accelerated by the high temperature, sulfurous acid being first formed. The reaction is shown by the following equation:

$$SO_2 + O + H_2O = H_2SO_4$$

After the sulfuric acid is thus formed soluble phosphates are formed by two separate reactions which I have determined by analysis. The first one,—

$$Ca_3P_2O_8 + 2H_2SO_4 + 6H_2O = CaH_4P_2O_8,2H_2O + 2(CaSO_4.2H_2O)$$

this reaction giving the soluble mono-calcium phosphate produced by comparatively small amounts of sulfuric acid; with the larger amounts of acid phosphoric acid is formed, the equation apparently being,—

$$Ca_3P_2O_8 + 3H_2SO_4 + 6H_2O = 2H_3PO_4 + 3(CaSO_4.2H_2O)$$

The action of the moisture upon the sulfur in converting it into sulfuric acid is due to contact of the individual particles of sulfur with the hydrogen and oxygen of the water coming from the condensed steam or atomized water particles. This forms a slight but very thin film of sulfuric acid around each individual particle of sulfur brought into contact therewith. These individual particles of sulfur are separated from each other on account of the very large proportion of ground phosphatic rock with which the sulfur is mixed, and being thus isolated from each other they are in excellent condition for the conversion, which would not be the case if the particles of sulfur were more closely associated. Moreover, inasmuch as the phosphatic rock has great affinity for the sulfuric acid, it immediately takes it away from the small particles of sulfur, thereby forming phosphoric acid and soluble calcium phosphate. This, in turn, permits the particles of sulfur to combine with more hydrogen and oxygen, thereby forming another film of sulfuric acid about them, which, in its turn, is taken up by the large predominating amount of phosphatic rock present in the mixture. The conversion is, therefore, a continuous one, consisting, first, of the formation of sulfuric acid and then of available phosphoric acid and soluble calcium phosphate in the manner described.

It is further to be noted that the invention presents a very important advantage in that the formation of the phosphoric acid begins in the fertilizer before it is spread upon or in the soil. This is of importance, for the reason that the natural salts contained in the soil have themselves a great affinity for the sulfuric acid and a great deal of the sulfuric acid thus formed would, therefore, be lost by the formation of sulfates (principally calcium sulfates) in the soil if the formation of the available phosphoric acid and soluble calcium phosphate had not already begun.

The product of the treatment of the mixture of ground sulfur and phosphatic rock after the moistening operation comprises finely ground phosphatic rock, finely ground sulfur, free sulfuric acid, free phosphoric acid, and soluble calcium phosphates, and the product in this form is in peculiarly favorable condition for exercising its function as a fertilizer. It is, of course, apparent that to the fertilizer may be added any other ingredients that are considered desirable for particular uses, as, for instance, nitrates or nitrogen-bearing compounds, or the like.

The object of tightly packing the material in the bags prepared for its reception is to permit it to hold its moisture until the moisture has full opportunity to act upon the sulfur in the development of the sulfuric acid desired therein, it being ascertained that to dispense with this packing operation permits the moisture in some cases to evaporate so rapidly that it does not have the full desired effect.

In making up the ground mixture of sulfur and phosphatic rock, I prefer to use a quantity of sulfur slightly in excess of that necessary to convert all of the phosphatic material present into soluble calcium phosphate, but I do not restrict myself to so doing, for the reason that the advantages of my invention are present even though the phosphatic material should be in excess of the sulfur, or even though they should be practically balanced in the mass.

Having thus described my invention, what I claim is:—

1. The process of treating a fertilizer consisting of a ground mixture of sulfur and phosphatic rock, which consists in moistening the same to initiate the formation of sulfuric acid and phosphoric acid in the mass, and after the moistening operation packing the material tightly to prevent evaporation of the moisture; substantially as described.

2. The process of treating a fertilizer consisting of a ground mixture of sulfur and phosphatic rock, which consists in steaming the same to initiate the formation of sulfuric acid and phosphoric acid in the mass; substantially as described.

In testimony whereof I affix my signature, in presence of two witnesses.

WILLIAM B. CHISOLM.

Witnesses:
JOHN C. PENNIE,
LAURA B. PENFIELD.